United States Patent Office 3,592,906
Patented July 13, 1971

3,592,906
SUBSTITUTED BENZIMIDAZOLES IN TREATING MAREK'S DISEASE
Tsung-Ying Shen, 858 Willow Grove Road, Westfield, N.J. 07096, and Theodore A. Maag, 16 Dellwood Lane, New Shrewsbury, N.J. 07724
No Drawing. Filed Mar. 24, 1969, Ser. No. 809,969
Int. Cl. A61k 27/00
U.S. Cl. 424—273
7 Claims

ABSTRACT OF THE DISCLOSURE

The use of bis-benzimidazoles in reducing mortality and decreasing lesion incidence of poultry exposed to Marek's disease and to compositions comprising the bis-benzimidazoles active ingredients are provided. More specifically, the invention relates to the use of the D,L, meso, and racemic stereoisomers of lower alkyl and lower alkoxy substituted benzimidazole compounds and soluble salts thereof as treatment against Marek's disease.

---

Marek's disease is a highly infectious lymphoproliferative disorder of poultry, especially chickens. Marek's disease has also been known as neural leukosis, neuralymphomatosis, acute avian leukosis, and skin leukosis. The causative agent(s) are viral with a Herpes-type virus definitely implicated as an etiological factor. Marek's disease usually is clinically evident in birds prior to sexual maturity i.e. before the first egg is laid. Clinical manifestations may be one or more of these signs: regional or generalized paralysis, diarrhea with fecal staining of posterior abdominal feathers, weight loss, dyspnea, blindness, enlarged abdomen, or death.

The lesions evident are one or more of the following: lymphocytic infiltrated peripherial nerves and/or feather follicles; lymphoproliferative foci, microscopic to several mm. in size, within any tissue of the body but principally within the liver, spleen, kidney, gonads, heart, proventriculus, breast muscle, skin, and nerves.

Marek's disease is estimated by the U.S. Department of Agriculture to cause a $200 million annual loss to the U.S. poultry industry. This loss is due to mortality and to the rejection of slaughtered birds carcasses as being unfit for human consumption. This rejection is due to the presence of the lymphoproliferative foci.

It is, therefore, an object of this invention to provide the use of the disclosed substituted benzimidazoles in the treatment of Marek's disease, to prevent poultry death as well as decreasing the incident of lymphoproliferative foci. Other objects of this invention will become apparent upon further reading.

The substituted benzimidazoles of this invention have the following structure

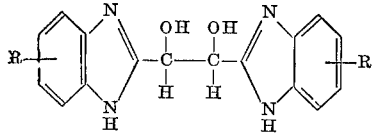

wherein R may be the same or different and is a lower alkyl group having 1–5 carbon atoms or a lower alkoxy group having 1–5 carbon atoms. Representative compounds of this invention are the following:

1,2-bis[5(6)-methoxy-2-benzimidazolyl] ethylene glycol,
1,2-bis[5(6)-ethoxy-2-benzimidazolyl] ethylene glycol,
1,2-bis[5(6)-propionoxy-2-benzimidazolyl] ethylene glycol,
1,4-bis[5(6)-pentoxy-2-benzimidazolyl] ethylene glycol,
1,2-bis[5(6)-methyl-2-benzimidazolyl] ethylene glycol,
1,2-bis[5(6)-ethyl-2-benzimidazolyl] ethylene glycol,
1,2-bis[5(6)-propyl-2-benzimidazolyl] ethylene glycol,
1,2-bis[5(6)-n-butyl-2-benzimidazolyl] ethylene glycol,
1,2-bis[5(6)-pentyl-2-benzimidazolyl] ethylene glycol,
1,2-bis[4(7)-methoxy-2-benzimidazolyl] ethylene glycol,
1,2-bis[4(7)-ethoxy-2-benzimidazolyl] ethylene glycol,
1,2-bis[4(7)-propionoxy-2-benzimidazolyl] ethylene glycol,
1,2-bis[4(7)-pentoxy-2-benzimidazolyl] ethylene glycol,
1,2-bis[4(7)-methyl-2-benzimidazolyl] ethylene glycol,
1,2-bis[4(7)-ethyl-2-benzimidazolyl] ethylene glycol,
1,2-bis[4(7)-propyl-2-benzimidazolyl] ethylene glycol,
1,2-bis[4(7)-n-butyl-2-benzimidazolyl]ethylene glycol, and
1,2-bis[4(7)-pentyl-2-benzimidazolyl] ethylene glycol.

In the preparation of the compounds of this invention, a 1,2-diaminobenzene is condensed with an optically active form of tartaric acid.

Tartaric acid, COOH(CHOH)$_2$COOH is a classic example of a compound having optical activity, due to its possession of two similar asymmetric carbon atoms. We refer to the optical isomers in this case as the D,L, meso, and racemic tartaric acids. The D and L refers to the convention of designating the configuration of the molecule, drawn according to Fischer plane projection. The D- and L- forms of tartaric acid, respectively, are levorotatory and dextrorotatory. The meso-form is an internally compensated inactive isomer, having a plane of symmetry in the molecule. The racemic acid is an equal mixture of the D- and L-forms, but is optically inactive due to the equal combination, an "externally" compensated isomer. The compounds prepared from the D-form of tartaric acid have been reported in the literature. In addition, we have found that the compounds formed with L- and meso-forms of tartaric acid, as well as with the racemic tartaric acid have found utility against Marek's disease.

The 1,2-diaminobenzenes which are used in this invention can be represented by the following formula:

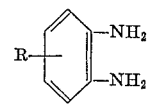

in which R can be a lower alkyl group having 1–5 carbon atoms or a lower alkoxy group having 1–5 carbon atoms.

These 1,2-diaminobenzenes are prepared from the corresponding substituted 1-amino-2-nitrobenzene derivative. The 1-amino-2-nitrobenzene can be catalytically hydrogenated to the 1,2-diaminobenzene form. In addition, it will be apparent to one skilled in the art that the 1-amino-2-nitrobenzene derivative can be prepared following various organic chemical synthesis. Any substituted benzene which can eventually be transformed into the 1,2-diamino form can be used in performing this invention.

The general methods used in the condensation reaction of the 1,2-diamino substituted benzene with the tartaric acid are well known and described in literature. Two moles of the diamine are refluxed with one mole of the dibasic acid in hydrochloric or sulfuric acid. A relatively long reflux period is employed, about 3–10 hours. The reaction solution is then cooled and the condensation product bis-benzimidazole isolated as the dihydrochloride or the sulfate. The dihydrochloride or sulfate can then be used as such or transformed into the free base compound by reaction with bicarbonate or aqueous amino. Conventional purification and recovery techniques are used. The free base compound can also be produced in situ without separate isolation of the acid salt.

The compounds of the invention are tested for their efficacy against Marek's disease in the following manner: Chickens are infected with virus containing lymphoblasts originally obtained from a chicken with a typical case of Marek's disease. The medication is parenterally administered daily as aqueous suspension of 1,2-bis[5(6)-methoxy-2-benzimidazolyl] ethylene glycol in different concentrations. After an appropriate experimental period, wherein over 50% of the non-medicated controls succumbed, all surviving birds are sacrificed. All dead and sacrificed birds are autopsied with lesion incidence recorded. Test results are given in Table I. Mortality is the percent of birds dead during the experimental period.

Comparative surviving time refers to the comparison of the average day of death post-medication between the various groups, with the standard being the non-medicated controls. The average lesion score rates the severity of the lesions noted upon autopsy, with 5 indicating maximum severity or death and with 1 referring to minimal irrelevant lesions.

TABLE I

| Dosage mg./kg. body weight | Number of chickens | Mortality, percent | Comparative surviving time, days | Average lesion score |
|---|---|---|---|---|
| 20 | 8 | 25 | +4 | 2 |
| 5 | 10 | 30 | +3 | 2 |
| 1 | 9 | 45 | +1 | 3 |
| 0 [1] | 71 | 62 | 0 | 4 |

[1] Nonmedicated controls.

In accordance with this invention, the substituted benzimidazoles are employed for controlling Marek's disease by administering them to poultry exposed to the disease, either in the drinking water, feed, or parenterally. The amount of the substituted benzimidazoles required for optimal results in treated poultry exposed to Marek's disease, will of course, vary on the particular compound used. Generally, the substituted bis-benzimidazoles show activity at concentrations of from 1 to 100 mg. of compound per kilogram of body weight.

When the compounds of this invention are administered parenterally, an aqueous suspension of the free-base form of the bis-benzimidazole, or an aqueous solution of the salt-form may be used. The concentrations of compound in the injection is adjusted to give the desired amount of compound per kilogram of body weight, generally from about 0.1–100 mg./kg.

The bis-benzimidazole may also be used by administering orally to poultry. It may be given in the feedstuff of the birds, in the drinking water, or if desired by direct administration dissolved or suspended in a suitable solvent. In many cases, only minor amounts are required in order to obtain the desired result.

It is preferred to disperse the bis-benzimidazoles in the finished feed of the animals, and to administer the medicated feed ad libitum to the birds. Good results against Marek's disease are achieved with feedstuff containing from about 0.001 to 0.1% by weight of the bis-benzimidazole. Dose levels in poultry feed or water are here expressed in terms of percent concentration because the exact amount of feed or water consumed by an individual bird is not measured as a matter of general practice.

The feedstuff compositions are those normally used in the poultry industry. They may be the so-called mashes containing ground grain, protein, and mineral and vitamin concentrates. Alternatively, they may consist of broiler feeds made up primarily of corn together with proteins and growth factors.

When the bis-benzimidazoles are administered to poultry by way of the drinking water, the treatment levels are generally about one-half of those that would be used in a solid feedstuff since the birds drink about twice as much as they eat.

Compositions which are one of the preferred features of the invention are feed supplements or pre-mixes in which the desired bis-benzimidazole is present in relatively large amounts. The carrier vehicle or diluent for such feed supplements should be essentially nonreactive with the compound, safely administrable to poultry, and one that is or may be a normal ingredient of the finished feed. Diluents which are normally employed are solid orally ingestible poultry feed additives such as distillers' dried grains, corn meal, citrus meal, fermentation residues, wheat middlings, corn gluten feed, ground oyster shells, attapulgus clay, wheat shorts, molasses solubles, corn cob meal, edible vegetable substances, toasted dehulled soya flour, soybean mill feed, antibiotic mycelia, soya grits, and the like. For the compositions of this invention, nutritive carriers are preferred. These supplements are incorporated in the poultry feed either directly or after an intermediate dilution or blending step. Generally, these concentrate formulations containing from about 10 to 40% by weight bis-benzimidazole are particularly suitable for addition to poultry feeds.

This invention is further described, but not limited to, the following examples, showing the processes for making the bis-benzimidazoles.

EXAMPLE 1

Preparation of L-1,2-bis[5(6)-methoxy-2-benzimidazolyl]ethylene glycol dihydrochloride 4-methoxy-2-nitro-1-aminobenzene (8.4 g., 0.05 mole) is dissolved in 50 ml. of 4 N hydrochloric acid, 1 g. of 5% palladium-on-alumina added and hydrogenation carried out in a Parr bomb apparatus. After uptake of the theoretical amount of hydrogen, the catalyst is removed by filtration and the filtrate containing 4-methoxy-1,2-diaminobenzene mixed with L-tartaric acid (3.75 g., 0.05 mole), 3 ml. of concentrated sulfuric acid, and the reaction mixture is heated for 8 hours at reflux. L-1,2-bis[5(6)-methoxy-2-benzimidazolyl] ethylene glycol dihydrochloride is recrystallized from 6 N hydrochloric acid and obtained analytically pure.

EXAMPLE 2

Preparation of L-1,2-bis[5(6)-methoxy-2-benzimidazolyl] ethylene glycol

The L-1,2-bis[5(6)-methoxy-2-benzimidazolyl] ethylene glycol dihydrochloride prepared in Example 1 is extracted with hot dilute ammonium hydroxide and washed with water. The product, L-1,2-bis[5(6)-methoxy-2-benzimidazolyl] ethylene glycol, is recrystallized from ethanol-water with the acid of decolorizing carbon.

EXAMPLE 3

Preparation of D-1,2-bis[5(6)-methoxy-2-benzimidazolyl]ethylene glycol dihydrochloride 4-methoxy-2-nitro-1-aminobenzene (8.4 g., 0.05 mole) is dissolved in 50 ml. of 4 N hydrochloric acid, 1 g. of 5% platinum-on-alumina added, and hydrogenation carried out in a Parr bomb apparatus. After uptake of the theoretical amount of hydrogen, the catalyst is removed by filtration, and the filtrate containing 4-methoxy-1,2-diaminobenzene mixed with D-tartaric acid (3.75 g., 0.05 mole), 3 ml. of concentrated sulfuric acid, and the reaction mixture heated for 8 hours. D-1,2-bis[5(6)-methoxy-2-benzimidazolyl] ethylene glycol dihydrochloride is recrystallized from 6 N hydrochloric acid and obtained analytically pure.

EXAMPLE 4

Preparation of D-1,2-bis[5(6)-methoxy-2-benzimidazolyl] ethylene glycol

The D-1,2-bis[5(6)-methoxy-2-benzimidazolyl] ethylene glycol dihydrochloride prepared in Example 3 is extracted with hot aqueous sodium bicarbonate solution and washed with water. The product, D-1,2-bis[5(6)-methoxy-2-benzimidazolyl] ethylene glycol is recrystallized from ethanol-water with the acid of decolorizing carbon.

EXAMPLE 5

Preparation of meso-1,2-bis[5(6)-methoxy-2-benzimidazol] ethylene glycol dihydrochloride The same general procedure of Example 3 is followed, except that meso-tartaric acid is reacted with the 4-methoxy-1,2-diaminobenzene. The product recovered is meso-1,2-bis[5(6) - methoxy-2-benzimidazolyl] ethylene glycol dihydrochloride. This latter compound can then be converted to the free hydrogen form of meso-1,2-bis[5(6)-methoxy-2-benzimidazolyl] ethylene glycol by extracting with hot dilute ammonium hydroxide as in Example 2.

We claim:

1. A method for treatment of poultry exposed to Marek's disease which comprises administering to the poultry an effective amount of a substituted benzimidazole having the following formula

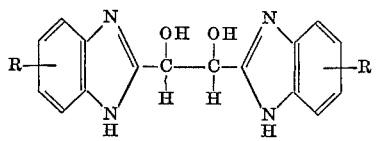

wherein R may be the same or different and is a lower alkyl group having 1–5 carbon atoms or a lower alkoxy group having 1–5 carbon atoms, or soluble salts thereof.

2. The method of claim 1 in which the substituted benzimidazole is 1,2-bis[5(6)-methoxy-2-benzimidazolyl] ethylene glycol.

3. The method of claim 2 in which the D-form of the substituted benzimidazole is used.

4. The method of claim 2 in which the L-form is used.

5. The method of claim 2 in which the meso-form is used.

6. A composition that comprises a poultry feedstuff having admixed therein from about 0.001 to 0.1% by weight of a substituted benzimidazole having the following formula:

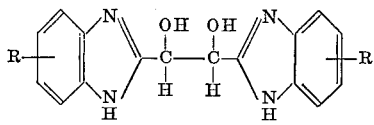

wherein R may be the same or different and is a lower alkyl group having 1–5 carbon atoms or a lower alkoxy group having 1–5 carbon atoms, or soluble salts thereof.

7. A parenterally administrable composition comprising an aqueous carrier and a substituted benzimidazole having the following formula:

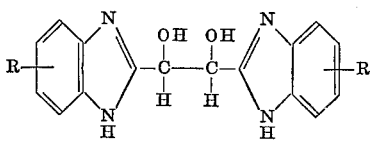

wherein R may be the same or different and is a lower alkyl group having 1–5 carbon atoms or a lower alkoxy group having 1–5 carbon atoms, or soluble salts thereof, the concentration of the benzimidazole being such that 0.1–100 mg./per kilogram of body weight are administered to an individual subject.

References Cited
UNITED STATES PATENTS 3,222,285   12/1965   Rai et al. _____ 260—309.2

SAM ROSEN, Primary Examiner

UNITED STATES PATENT OFFICE
CERTIFICATE OF CORRECTION

Patent No. 3,592,906         Dated  July 13, 1971

Inventor(s) Tsung-Ying Shen and Theodore A. Maag

It is certified that error appears in the above-identified patent and that said Letters Patent are hereby corrected as shown below:

In Column 1, following the names and addresses of the inventors, insert the following:

-- assignors to Merck & Co., Inc., Rahway, New Jersey, a corporation of New Jersey --.

Signed and sealed this 7th day of December 1971.

(SEAL)
Attest:

EDWARD M. FLETCHER, JR.          ROBERT GOTTSCHALK
Attesting Officer                Acting Commissioner of Patents